I. H. WRIGHT.
MACHINE FOR FORMING GROOVES OR FLUTES IN TWIST DRILLS AND THE LIKE.
APPLICATION FILED AUG. 4, 1917.
1,346,928.
Patented July 20, 1920.
5 SHEETS—SHEET 1.
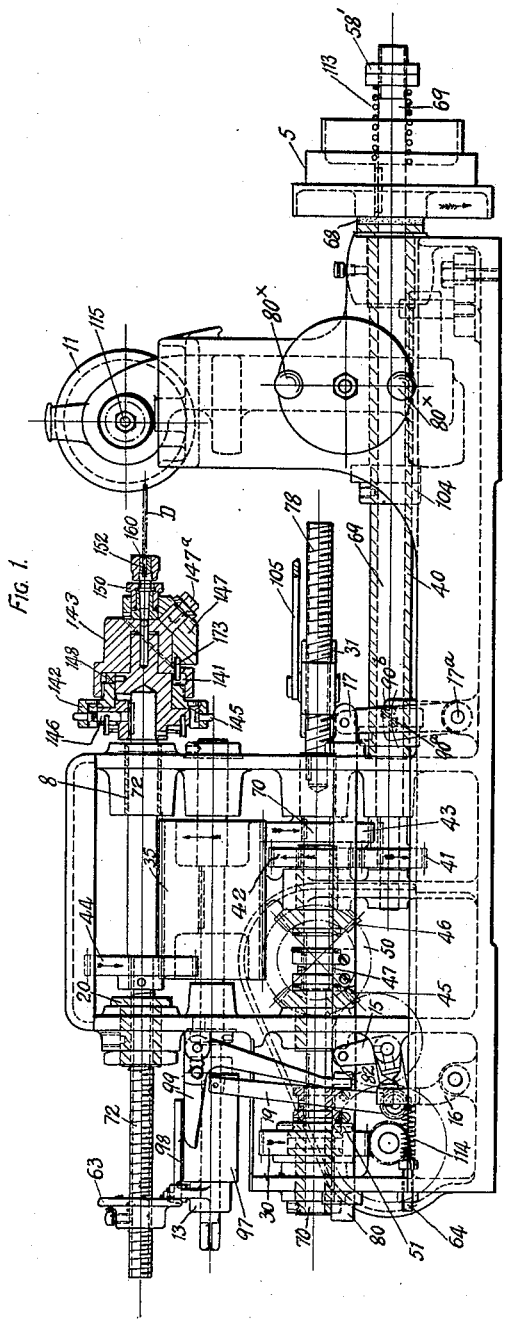
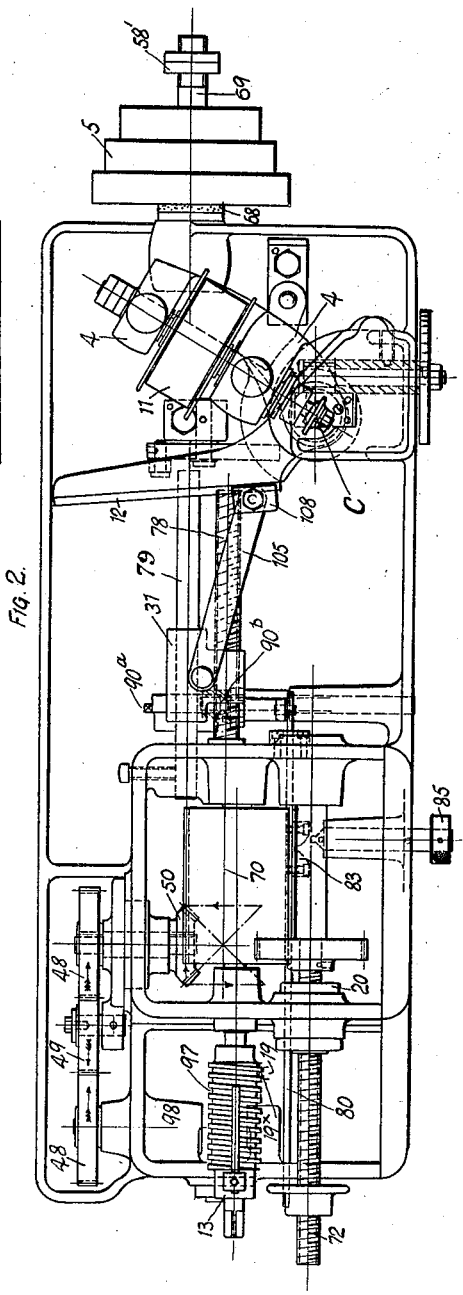
INVENTOR:
Isaac Henry Wright
By
ATTY

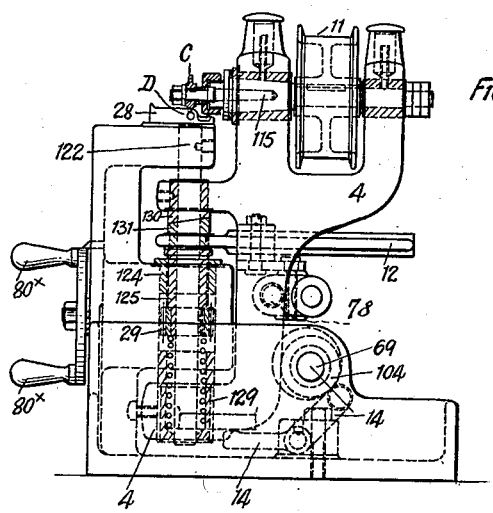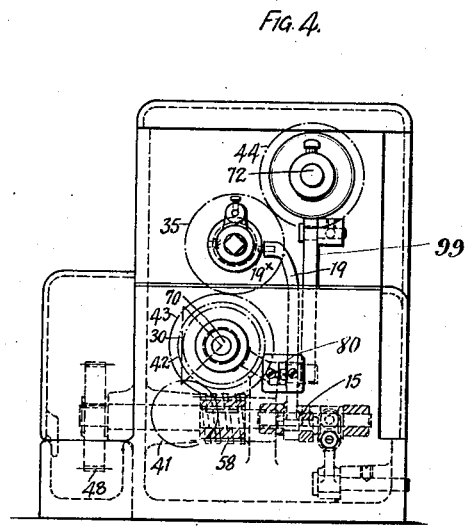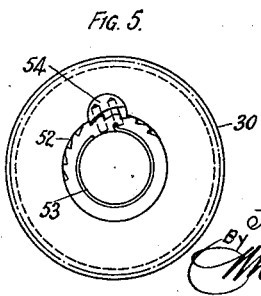

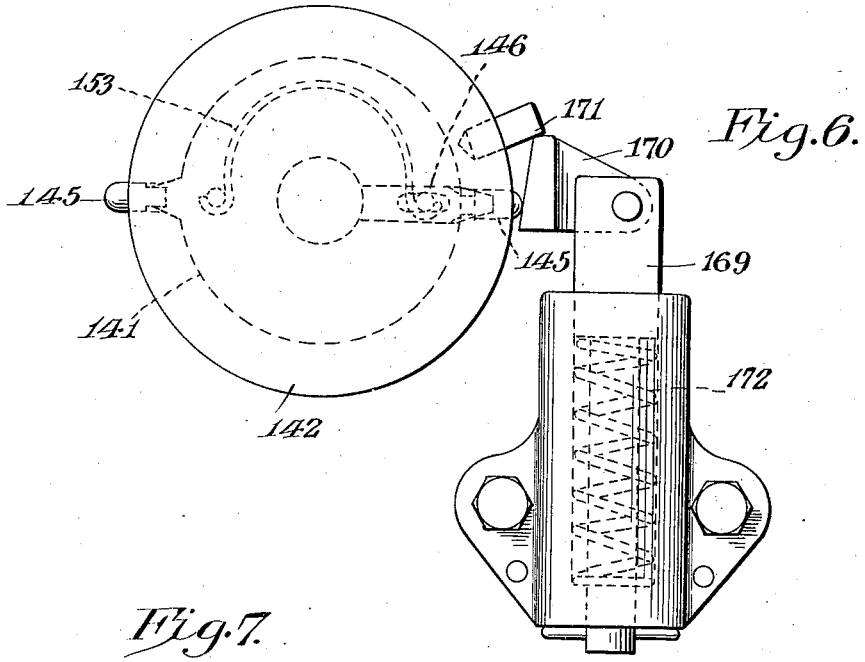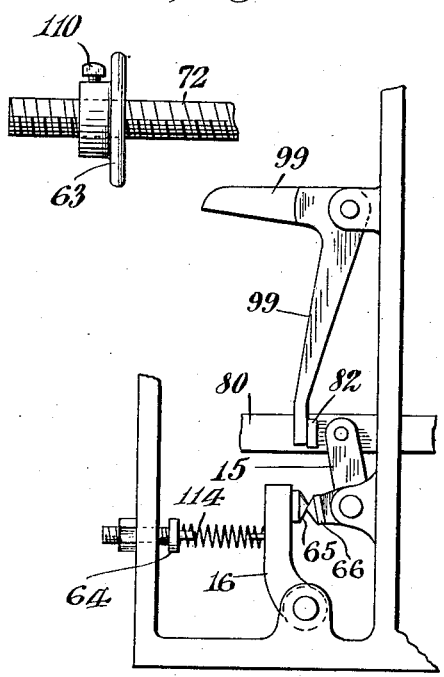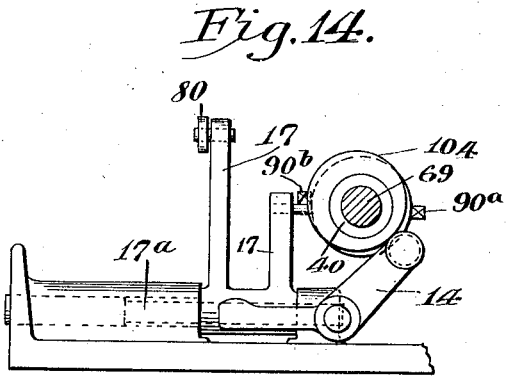

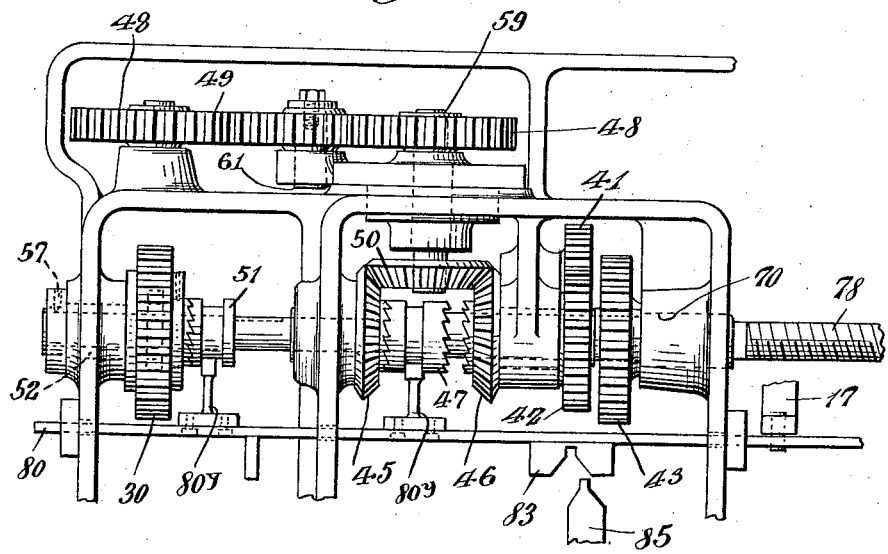
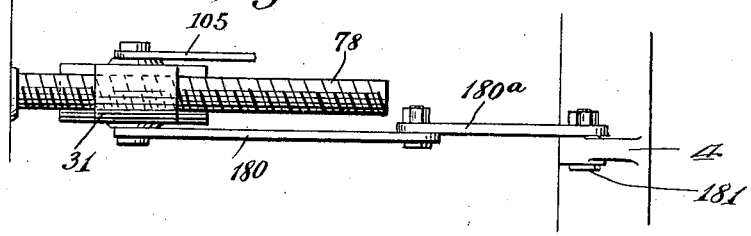
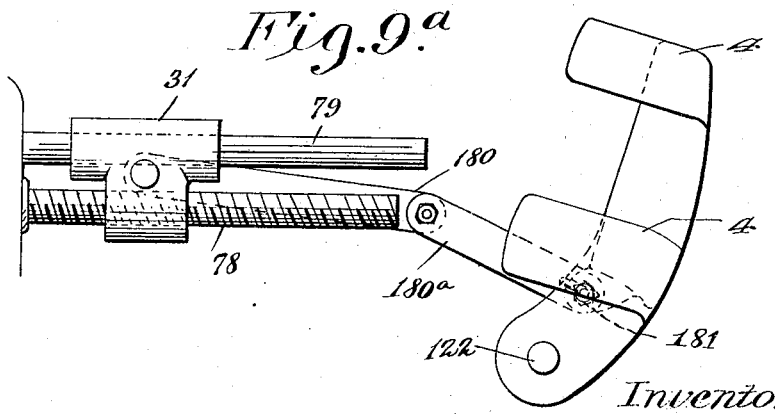

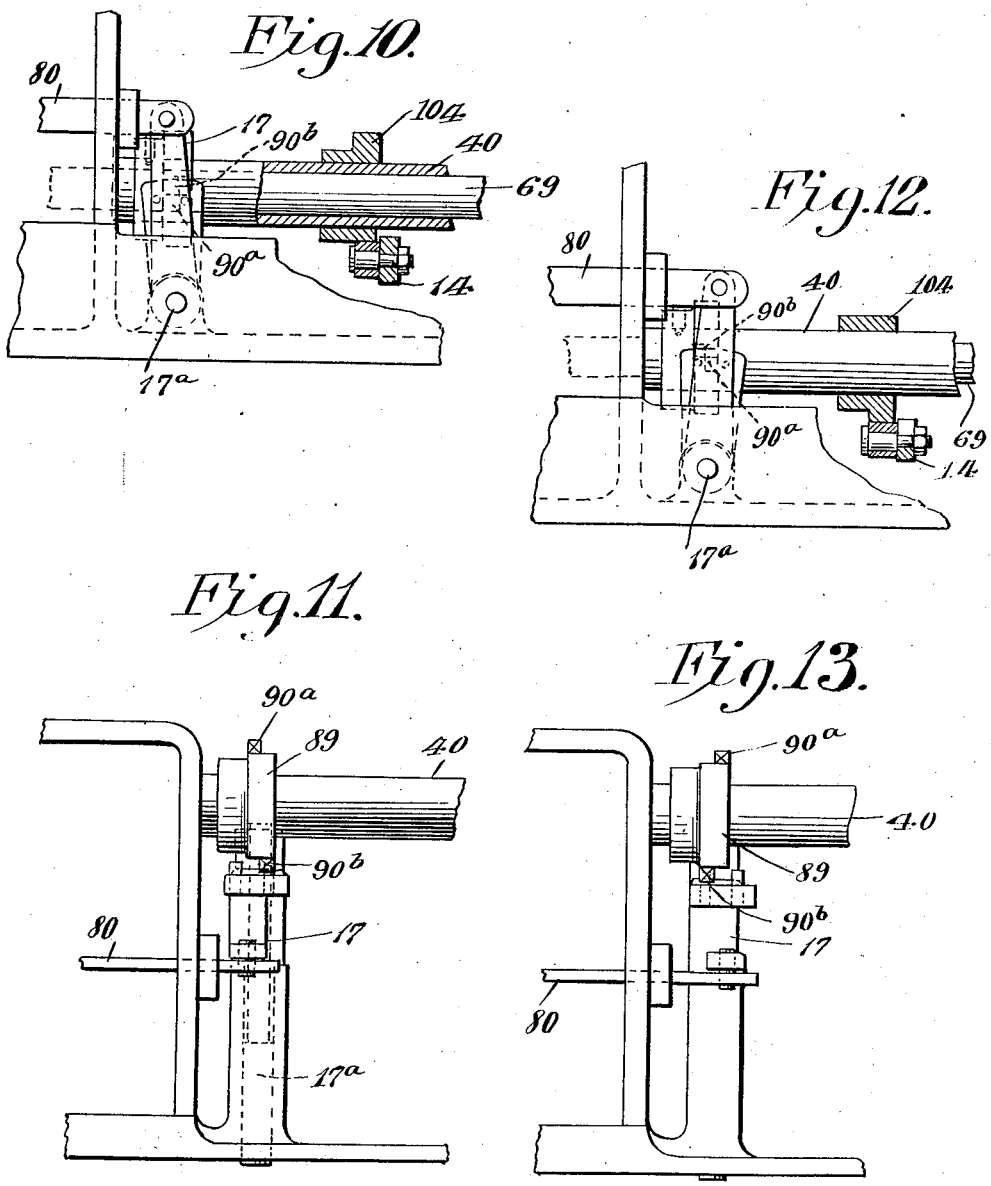

UNITED STATES PATENT OFFICE.

ISAAC HENRY WRIGHT, OF MANCHESTER, ENGLAND, ASSIGNOR TO SMITH & COVENTRY LIMITED, OF MANCHESTER, ENGLAND.

MACHINE FOR FORMING GROOVES OR FLUTES IN TWIST-DRILLS AND THE LIKE.

1,346,928.  Specification of Letters Patent.  Patented July 20, 1920.

Application filed August 4, 1917. Serial No. 184,465.

*To all whom it may concern:*

Be it known that I, ISAAC HENRY WRIGHT, a subject of the King of Great Britain, residing at Gresley Iron Works, Ordsal Lane, Salford, Manchester, in the county of Lancaster, England, have invented new and useful Improvements in Machines for Forming the Grooves or Flutes in Twist-Drills and the like, of which the following is a specification.

This invention relates to improvements in machines for forming the grooves or flutes in twist drills and the like.

The improved machine comprises three principal mechanisms, namely, first, the cutting mechanism with an adjustable cutter head arranged to be swiveled to vary and regulate the width of the groove or flute and to be raised or lowered to vary the depth of the same. Secondly, the chuck or work carrying mechanism which holds the drill blanks (or other work) and presents them successively to the cutter or cutters by means of a conical turret movable about an axis oblique to the work axis of the machine and controlled by an indexing apparatus to determine the number of grooves or flutes to be formed in the work.

Thirdly, the traversing mechanism by which the chuck is alternately advanced toward and withdrawn from the cutter head while suitable angular movements are imparted to the chuck to produce the required spiral in the grooves or flutes by means of a bevel and clutch reversing gear and slow traverse worm gear with clutch and internal ratchet mechanism of which a sliding nut connected to levers in the cutter carrying mechanism forms a distinguishing feature.

I illustrate my improved machine on the accompanying drawings in which—

Figure 1 is a front view. Fig. 2 is a plan. Fig. 3 an elevation of the cutting end and Fig. 4 an elevation of the other end showing the traverse regulating mechanism of the machine.

Fig. 5 is a detail view of the internal construction of the worm wheel and ratchet.

Fig. 6 is a detail view of the spindle head, index spring plunger and inclined stop. Fig. 7 is a detail view of the device for changing the traverse from quick advance to cutting feed. Fig. 8 is a sectional plan of the clutches and ratchet for traverse regulation and Figs. 9 and 9$^a$ are details of mechanism for swiveling the cutter to vary the width of groove cut on the twist drill.

Figs. 10 to 14 are detail views of the escapement mechanism. Figs. 10, 11 and 14 showing the relative position of the parts during the cutting stroke and Figs. 12 and 13 the relative position of the parts during the return stroke.

In carrying my invention into effect I employ a cutter C or cutters of suitable contour mounted in the well known manner in the spindle 115 (Fig. 3) which is rotated by belt (not shown) and pulley 11 or by gearing in its bearing in the cutter head 4. This cutter head 4 is arranged to swivel about a vertical spindle 122, the axis of which intersects the axis of the cutter spindle 115 and also the axis of the drill blank D or other work to be fluted the blank passing through a suitable guide 28. To regulate the depth of the groove or flute the cutter head is vertically adjustable upon its spindle 122 being raised by handles 80$^x$ rotating a worm gear 29 and sleeve 124 and screw 125. The upward pull of the driving belt (not shown) on the driving pulley 11 is resisted by a strong spring 129 or springs bearing downward on the lower limb of the cutter head or otherwise suitably arranged.

For the purpose of producing a variable depth of groove or flute spiral cams 130 and 131 are introduced between the raising screw and the cutter head, the cam portion 131 having secured to it a lever 12 which is connected to the traverse mechanism by a connecting rod 105, Fig. 2, the degree of movement being variable by moving a connection block 108 along the lever 12.

In order that the cutter C may be lifted out of the groove during the return movement of the work a lever 14, Fig. 3, bears against its lower limb and is acted upon at the proper times by a cam 104 on a sleeve 40 on the constantly rotating cone shaft 69 which drives the traverse mechanism. The time of operation of the cam is regulated by the traversing movement as hereinafter described.

The drill blank D or other piece to be grooved or fluted is held in a simple spring chuck indicated by the numerals 150, 152 and 160, Fig. 1, attached by a bayonet joint to the conical turret 147 which carries an odd number of such chucks when the number of flutes required is even, or an even number of chucks when the number of flutes required is odd. The conical turret 147 is arranged to rotate about an oblique axis 147ª intersecting the main axis of the drill blank D and its spindle 72 the chucks being so located in the turret that they can be brought exactly in line with the work spindle 72 and there located by a spring and ball plunger. The inclined turret axis is formed upon a revolving head 143 to which is rigidly fixed a cup 142 these parts being mounted and free to rotate upon the spindle head 141 which is keyed rigidly upon the work spindle 72 of the machine.

Relative rotation between the chuck and the work spindle 72 is prevented by a spring plunger 146 in the spindle head 141, Figs. 1 and 6, the plunger 146 engaging with suitable notches in the inner surface of the cup 142. When it is desired to index the drill blank D to be fluted this spring plunger 146 is caused to recede into the spindle head 141 by the action of a pin 145 the outward projecting end of which at the proper time engages the inclined surface of a stop 170, Fig. 6, with the result that the spindle 72 and work head 141 are disconnected from the chuck carrying members and may continue their revolution until the plunger 146 engages the next notch, the number of notches corresponding with the number of flutes to be cut in the work.

This action is always arranged to occur at the end of the return traverse and the reversal is carefully timed to agree with the instant when the plunger 146 engages with the notch. During this relative rotation, the chuck carrying portion is prevented from rotating by a pin 171 resting on the stop 170 mounted upon a spring 172 to allow for any slight irregularity of the timing of reversal. This relative rotating of the spindle head 141 and the chuck carrying head is caused also to rotate the conical member 147 carrying the chucks in the following or other suitable manner:—

The conical member 147 has a number of projecting pins 173, Fig. 1, serving as rudimentary teeth by which it may be rotated on its oblique axis and these teeth intercept the path of pins 148 in the spindle head 141. While the spindle head and chuck body are rotating together no inter-action occurs between these two series of pins but when the plunger 146 is depressed and relative rotation occurs the pins 148 in the spindle head act on the pins 173 in the conical turret. During the fraction of revolution before the plunger 146 again engages, the pins 148 have turned the conical turret 147 to its next position and brought a fresh drill blank D in line with the work spindle and ready for advancing to the cutting mechanism.

The traversing mechanism consists of the cylindrical spindle 72 upon one end of which is fixed the chuck mechanism previously described.

A continuation of this spindle at the other end is in the form of a screw whose pitch is the same as the spiral pitch of the groove or flute to be formed. This spindle is carried in a plain cylindrical bearing 8 on the plain part and a nut bearing 20 on the screwed part.

The spindle 72 is rotated in either direction by a spur gear 44 keyed upon it and engaging with a wide faced spur gear 35 arranged as hereinafter described. When the spindle 72 is rotated in the forward direction the chuck mechanism and the work carried by it are advanced under the cutter C with a correct spiral movement as governed by the screw 72 and nut 20. Movement in the reverse direction withdraws the work from the cutter C. The wide faced spur wheel 35 is driven by a gear 43 keyed upon a shaft 70, reversals and variation of speed of which are effected as follows:—

Power from the overhead driving apparatus or countershaft is received by a step cone 5, Fig. 1, which is keyed upon a shaft 69 carrying also a gear 41 engaging another gear 42 which, though keyed permanently to a bevel wheel 46 runs loosely upon its shaft 70. This bevel wheel 46 is connected to a second bevel wheel 45 by an intermediate bevel wheel 50 forming a reversing mechanism of well known form. The shaft 70 may be connected to either of the bevel wheels by a sliding clutch 47 engaging corresponding clutches on the parallel bevel wheels 46 or 45. The intermediate bevel wheel 50 is used as a starting point for a train of gears 48, 49, 48, (Fig. 2) arranged to give motion to a worm 58 (Fig. 4) engaging a worm wheel 30. The considerably reduced speed at which the worm wheel 30 rotates is designed to suit the actual cutting advance of the drill blank D or work. The internal construction of the worm wheel 30, as clearly indicated in the detail view, Fig. 5, is such that its outer portion which engages the worm 58 is connected to the center ratchet portion 52 by a rocking ratchet pawl 54 to insure correct engagement of which a friction spring 53 is placed in a groove in the wheel engaging pins on the ratchet pawl 54. This ratchet mechanism is designed to drive the center portion in the feeding direction of the traverse and by reason of the ratchet it does this only when the clutch 47 is disengaged from the bevel wheels 46 and 45. If the clutch 47 be engaged to drive the traverse mechanism in the same direction as the ratchet would drive it the shaft and center 52 of the ratchet wheel over-runs the pawl 54 and advances the drill blank D at the quick rate. In order that the drill blank or work may be withdrawn by revolving in the opposite direction the ratchet wheel can be disconnected from the shaft by a clutch 51 both clutches 47 and 51 being operated by fingers or projections 80$^y$ upon a slide bar 80, Fig. 8.

By suitable location of the clutch 54, the operating finger 80$^y$ on the slide bar 80 and a suitable degree of lost motion between the clutch and its operating finger the slide bar 80 may move a sufficient distance to disengage the clutch 47 from its bevel wheel 45 while still allowing the other clutch 51 to engage the ratchet center 52 of the worm wheel 30. Further movement of the slide bar 80 withdraws the latter clutch 51 and totally disconnects the worm wheel 30 after which it engages the other clutch 47 with the other bevel wheel 46 for the quick return traverse of the work. From this it will be understood that while the clutch 47 engages one bevel wheel 45 the work is advancing rapidly toward the cutter C just before reaching which the slide bar 80 is operated to disconnect this clutch 47 from its bevel wheel 45 leaving the other clutch 51 in engagement with the ratchet center 52. The slow moving worm gear 30 then takes up the continuation of the movement by means of its ratchet mechanism, 52, 54, and feeds the work slowly under the cutter C. On completing the length of groove or flute required in the work the slide bar 80 is moved still farther to the right when the clutch 51 is withdrawn from the ratchet wheel 52 and the other clutch 47 is engaged with the opposite bevel wheel 46 which, running in the opposite direction, quickly returns the work spindle 72 to the starting position.

The limits of travel of the work spindle 72 are defined by adjustable projections upon a cylinder 97, Fig. 2, or equivalent secured upon the same shaft as the wide faced gear 35 which drives the work spindle 72. In this cylinder 97 is cut a deep spiral groove in which engages the pin 19$^x$ on the end of a connecting link 19.

By a suitable arrangement of the stop members 98, 13, a suitable number of revolutions of the cylinder 97 may occur before the link 19 comes in reach of the stop member 98 which is revolving with the cylinder. When, finally, this stop 98 makes contact with the link 19, it depresses the same and gives motion to a bell crank lever 15 the other member of which engages the slide bar 80 by a pin 82, Figs. 7 and 8. The position of this lever 15 is also controlled by a trip spring 114 of well known form, known as the "load and fire" mechanism, and which avoids the possibility of the mechanism stopping when half reversed and insures that reversing, once commenced shall be completed. As shown in Figs. 1 and 7, the trip spring 114 is coiled and confined between a stud 64 on the frame and a stud on a lever 16 which has a V shaped striking face 65 in contact with a similar striking face 66 on one arm of the bell crank lever 15. At the other extreme of travel the pin 19$^x$ and link 19 are elevated by a fixed pin in the spiral groove engaging the pin 19$^x$ and causing the reverse order of these movements thus engaging the clutch 47 with the bevel gear 45 and the clutch 51 with the ratchet center 52.

The reversing mechanism so far described deals only with the definite reversal at each extreme of the travel, the intermediate change which occurs when the fast forward travel is changed to the slow travel for the cutting operation is effected as follows:—

At the moment preceding contact of the work with the cutter C, a collar 63, Figs. 1 and 7, on the work spindle 72 rides over a projecting lever 99 the lower arm of which bears upon the pin 82 on the sliding bar 80 and, moving this to the right an amount sufficient to disengage the bevel wheel clutch 47 from the fast forward bevel 45, leaves the motion to be continued during cutting by the slow moving worm wheel 30 acting through its ratchet. It will be understood that the collar 63 can be set at any suitable position along the screwed portion of the work spindle 72 and also that during its action on the lever it is acting against the "load and fire" mechanism but the amount of this motion is not sufficient to trip the same and cause complete reversal. The stop member 98 connected to the stop cylinder 97 is the one whose setting determines the closeness with which the work spindle 72 approaches the cutter C and this setting is regulated by the length of the work and of the grooves or flutes to be cut.

To vary the speed at which the work travels under the cutter C the train of wheels 48, 49, 48, from the intermediate bevel wheel 50 may be replaced with other suitable wheels.

To bring the travel mechanism to rest at any moment desired the slide bar 80 is fitted with a V block 83 adjacent to which is a plunger 85 having a suitably formed end to engage the V block. When the plunger 85 is pushed into the V block 83 it moves the slide bar 80 into a position in which all clutches are disengaged and in so doing it overcomes the spring 114 of the "load and fire" mechanism previously described.

To re-start the mechanism the plunger 85 is withdrawn when the spring 114 of the "load and fire" mechanism re-asserts itself and returns the clutches to the positions which they held before the plunger was used.

Certain movements of the head 4 for carrying the cutting mechanism, viz. the raising of the cutter C to give decreased depth of groove and the swiveling of the cutter to give increased width of groove are obtained by connection to the traverse mechanism in the following manner:—

The shaft 70 carrying the reverse mechanism and subject to the action of the same has a continuation 78, Figs. 1 and 2, in the form of a screw. A slide bar 79 (Fig. 9ª) adjacent and parallel to the screw 78, carries a slide nut 31 which thus has a movement proportional to the movement of the work held in the chuck as to both revolution and advance and return. On the upper face of this nut 31 is attached the connecting rod or link 105 referred to in connection with the lever 12, and the other end of this link 105 is attached to the connecting block or adjustable clamp 108 on the lever 12 which is fixed upon the cam member 131, Fig. 3, which by means of the corresponding cam 130 controls the vertical position of the cutter head 4. To the lower face of the nut 31 may be attached a connecting link 180, see Figs. 9 and 9ª. Connected to the free end of the link 180 is one end of link 180ª, the opposite end of the latter being slotted and rigidly connected to the head 4 by a bolt 181 which passes through the slot and permits adjustment of the link 180ª upon the head when the bolt is loosened. This adjustable connection is such that the action of the nut 31 is to swivel the cutter head 4 about its vertical axis 122 passing through the cutter C and the work D, the amount of this swivel action during the travel of the work being adjusted to give the required widening of the groove or flute to be formed. The cutter head 4 is subject to a further movement which raises the cutter C clear of the work during the return travel with a view to avoid marking the finished surface. This motion is obtained from the cone shaft 69 in the following manner:—

The cone shaft 69 passes through the sleeve 40 which is frictionally connected to the shaft by a slipping clutch 68 adjusted by a spring 113 and lock nuts 58'. Upon this sleeve 40 is fixed the cam 104 which engages one arm of the bell crank lever 14 the other arm bearing on the bottom surface of the cutter head 4 in such a way that the high side of the cam 104 acts on the lever 14 thereby elevating the cutter head 4 an amount sufficient to lift the cutter C clear of the work D. The times of this action are controlled by an escapement on the sleeve 40 the pawl or detent lever 17 of which is fulcrumed on a stud 17ª and is connected to the slide bar 80 of the reverse mechanism.

This escapement, which is illustrated by the detail views, Figs. 10 to 14, is arranged to allow half a revolution of the sleeve 40 and cam 104 at each reversal of the machine the two positions of the cam corresponding with the cutting position of the cutter head 4 during the the cutting stroke as illustrated by Figs. 10, 11 and 14, and the raised position of the cutter head on the return stroke as illustrated by Figs. 12 and 13.

On the sleeve 40 is fixed a disk with two projections or pins 90ª, 90ᵇ, diametrically opposite but in different planes. Near this disk is the detent lever 17 which is adapted to engage one or other of the two pins 90ª, 90ᵇ, being moved into such engagement by the slide bar 80 to which it is loosely connected.

When the pin 90ᵇ is engaged with the detent lever 17 the lever 14 is uninfluenced by the cam 104 which is held from rotation and the cutter head 4 is allowed to rest in its lowest position while a groove is being cut in the blank D. When the slide bar 80 acting on the detent lever 17 releases the pin 90ᵇ the sleeve 40 makes half a revolution until the pin 90ª engages the detent lever 17 meanwhile the cam 104 in its half revolution depresses the lever 14 and raises the cutter head 4 so that the work travels back clear of the cutter C during the return stroke.

What I claim as my invention and desire to secure by Letters Patent of the United States is:—

1. A machine for making twist drills comprising a work carrying mechanism including a work spindle, a turret rotatably mounted upon said spindle on an axis which is oblique to the axis of said spindle, a plurality of work holding members mounted on said turret, a cutter, said turret being adapted to rotate during the cutting operation of the drills, means for automatically moving said turret about the work spindle to successively present the surfaces for grooves in each drill to the cutter, and means for automatically moving the turret about its oblique axis for presenting successive pieces of work to the cutter.

2. A machine for making twist drills comprising a cutter, a work carrier, and means for moving the work carrier toward and away from said cutter, comprising a screw-threaded shaft, mechanism for reversing the direction of movement of said shaft, and means for retarding the movement of said shaft comprising a worm gear interposed between the mechanism and said shaft, an internal pawl and rachet connection between said shaft and worm gear, and a clutch operating member having means for causing lost motion, said member operatively connecting the worm gear and shaft.

3. A machine for making twist drills comprising a work carrying mechanism including a work spindle, a turret rotatably mounted upon said spindle on an axis which is oblique to the axis of said spindle, a plurality of work holding members mounted on said turret, a cutter, said turret being adapted to rotate during the cutting operation of the drills, means for automatically moving said turret about the work spindle to successively present the surfaces for grooves in each drill to the cutter, a cutter head for said cutter mounted for movement in horizontal and vertical planes, means for actuating said cutter head whereby said cutter will be caused to cut grooves in the work, varying in width and depth, and means for moving said mechanism toward and away from said cutter in such manner that said mechanism will be fed for a major portion of the distance toward said cutter at a speed exceeding the speed at which it is fed for the remainder of the distance toward said cutter and for moving the mechanism away from the work at a quick speed.

In testimony whereof I have signed my name to this specification in the presence of two subscribing witnesses.

ISAAC HENRY WRIGHT.

Witnesses:
S. W. GILLETT,
HERBERT ROWLAND ABBEY.